(12) United States Patent
Kuroiwa et al.

(10) Patent No.: US 9,442,612 B2
(45) Date of Patent: Sep. 13, 2016

(54) TOUCH PANEL DISPLAY DEVICE AND TOUCH PANEL CONTROLLER

(71) Applicant: Synaptics Display Devices GK, Tokyo (JP)

(72) Inventors: Tsuyoshi Kuroiwa, Tokyo (JP); Tatsuya Ishii, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 234 days.

(21) Appl. No.: 14/147,513

(22) Filed: Jan. 4, 2014

(65) Prior Publication Data

US 2014/0210776 A1    Jul. 31, 2014

(30) Foreign Application Priority Data

Jan. 28, 2013   (JP) ................................ 2013-012921

(51) Int. Cl.
*G06F 3/044*   (2006.01)
*G06F 3/041*   (2006.01)

(52) U.S. Cl.
CPC ............ *G06F 3/044* (2013.01); *G06F 3/0416* (2013.01); *G06F 2203/04809* (2013.01)

(58) Field of Classification Search
CPC .................................. G06F 3/044; G06F 3/041
See application file for complete search history.

(56) References Cited

U.S. PATENT DOCUMENTS

| | | | |
|---|---|---|---|
| 2008/0250167 A1* | 10/2008 | Kuroda ................. | G06F 13/385 710/31 |
| 2011/0248723 A1* | 10/2011 | Yeh .......................... | G01D 5/24 324/601 |
| 2012/0113071 A1* | 5/2012 | Kawaguchi ............. | G06F 3/044 345/204 |

FOREIGN PATENT DOCUMENTS

JP    2012-256100 A    12/2012

* cited by examiner

*Primary Examiner* — Michael Faragalla
*Assistant Examiner* — Chayce Bibbee
(74) *Attorney, Agent, or Firm* — Miles & Stockbridge P.C.

(57) ABSTRACT

A common touch panel controller is used for performing touch detection by driving both a touch panel superimposed on a display panel of a touch panel display portion for display, and a touch sensor superimposed on a touch key pattern of a touch key input portion for buttons. A control circuit capable of switching detection characteristics of a detection circuit common to the both in accordance with detection from the touch panel display portion and detection from the touch key input portion is adopted in the touch panel controller.

18 Claims, 9 Drawing Sheets

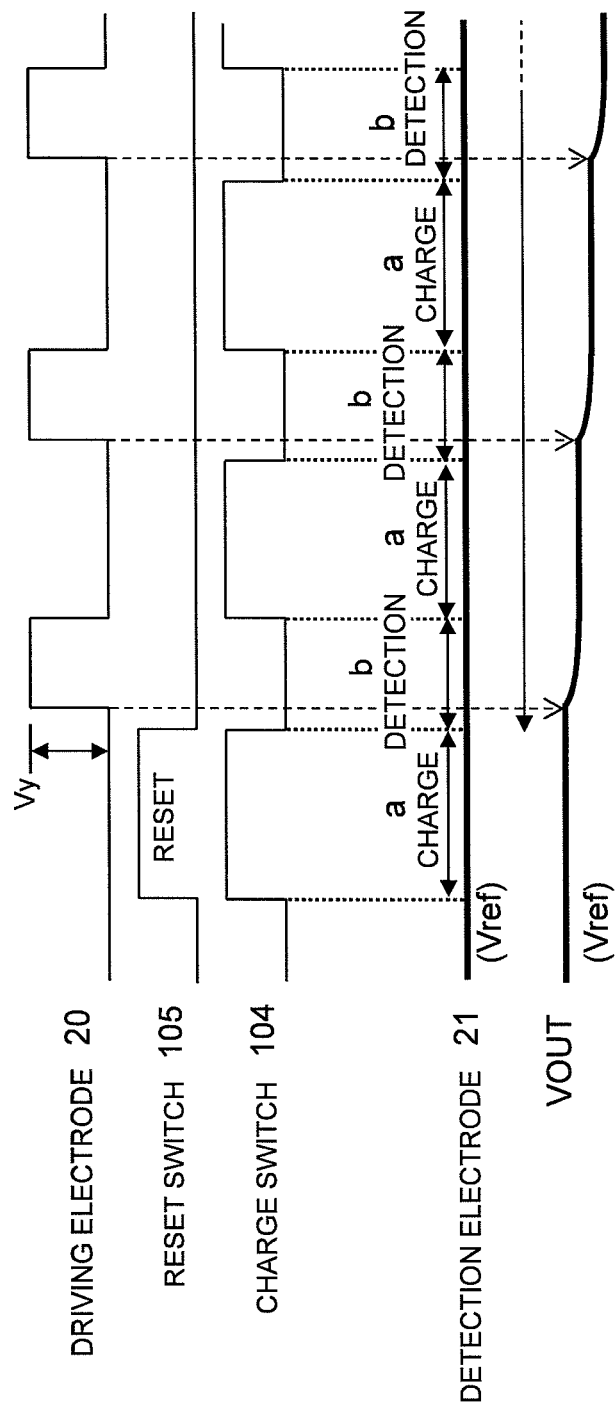

TOUCH PANEL DISPLAY DEVICE AND TOUCH PANEL CONTROLLER

CROSS-REFERENCE TO RELATED APPLICATIONS

The Present application claims priority from Japanese application JP2013-012921 filed on Jan. 28, 2013, the content of which is hereby incorporated by reference into this application.

BACKGROUND

The present invention relates to a touch panel display device including a touch panel display portion as a display region and including a touch key input portion as a button region, and a touch panel controller applicable to such a touch panel display device, and relates to a technique effective when applied to, for example, a data processing apparatus and the like.

A display region and a button region are formed on the surface of a mobile terminal such as a tablet or a smartphone. A touch panel is disposed in the display region so as to overlap a liquid crystal panel as exemplified in JP-A-2012-256100, and a plurality of buttons are disposed in the button region. A user can operate the touch panel directly using a finger or the like with respect to a position corresponding to information displayed on the display region. Buttons in the button region can be operated separately from the operation of the touch panel.

SUMMARY

The inventor has examined that in case that buttons in a button region are formed in a touch sensor such as a touch switch, the driving and detection of a touch panel of a display region and the driving and detection of the touch sensor of the button region are controlled by one touch panel controller.

In order to realize multi-touch detection with respect to the touch panel, for example, a mutual capacitance detection type is required to be adopted. However, the touch sensor of the button region is satisfied by a self-capacitance detection type in case that an on-off switch function is sufficiently realized. Further, load capacitances are different from each other due to a difference between a panel and a single switch, or the like. It is possible to separately use touch panel controllers that perform driving and detection suitable for such a difference.

However, in case that two touch panel controllers for use of display and buttons are separately used, there is a problem in that an increase in cost is caused. When one touch panel controller for use of display and buttons is used, a new scheme is required in which the difference in detection characteristics and other electrical characteristics for the panel and the switch has no adverse effect on touch detection.

The above and other problems and novel features will be made clearer from the description and the accompanying drawings of this specification.

The following is a brief description of the outline of the representative embodiment of the embodiments laid open in this application.

That is, a common touch panel controller is used for performing touch detection by driving both a touch panel superimposed on a display panel of a touch panel display portion for display, and a touch sensor superimposed on a touch key pattern of a touch key input portion for buttons. A control circuit capable of switching detection characteristics of a detection circuit common to the both in accordance with detection from the touch panel display portion and detection from the touch key input portion is adopted in the touch panel controller. Alternatively, detection parameters may be individually set in the touch panel controller by adopting individual detection circuits in each of the touch panel and the touch sensor. Driving circuits of the touch panel and the touch sensor may be formed individually, or some of the driving circuits of the touch panel may be formed in common with the touch sensor.

The following is a brief description of an effect obtained by the representative embodiment of the embodiments laid open in this application.

That is, the cost of the touch panel display device can be reduced using the touch panel controller common to the use of display and buttons, and the difference in detection characteristics and other electrical characteristics for the touch panel and the touch sensor serving as a switch can have no adverse effect on touch detection.

BRIEF DESCRIPTION OF THE DRAWINGS

FIG. 6 is a timing diagram illustrating a detection operation timing of an integration circuit which is in synchronization with a change in a driving pulse supplied to a driving electrode.

DETAILED DESCRIPTION OF THE INVENTION

1. Summary of the Embodiments

Figure 1:
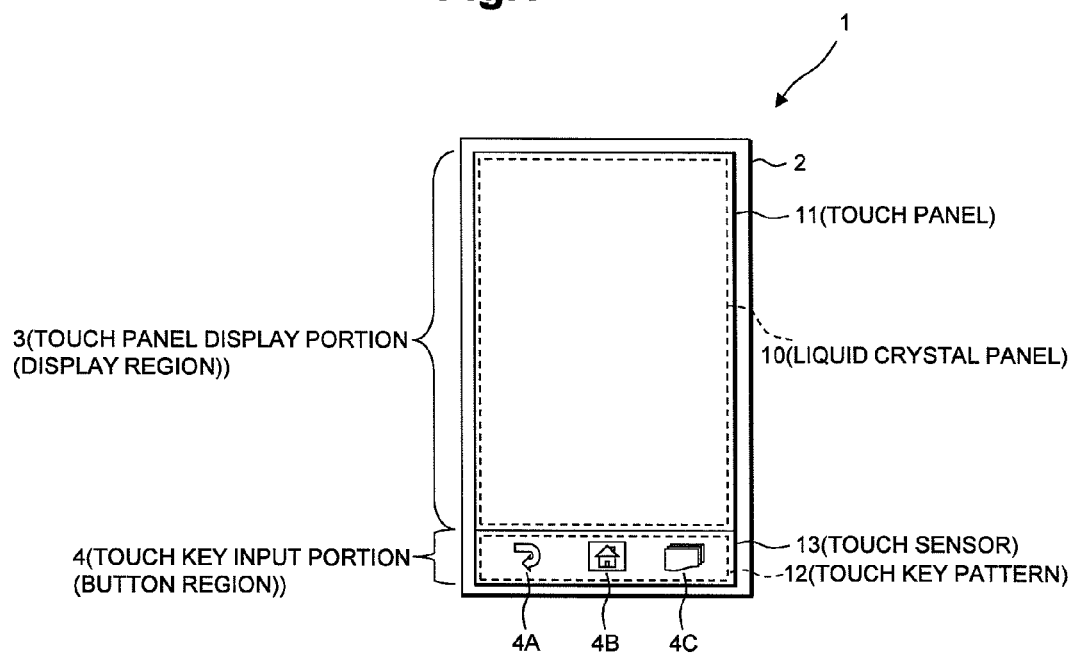
FIG. 1 is a plan view illustrating an appearance of a mobile terminal such as a tablet or a smartphone to which a touch panel display device is applied.

First, the summary of the embodiments disclosed in the present application will be described. Reference numerals and signs in the drawings that are referred to with parentheses applied thereto in the description of the summary of the embodiments are merely illustrative of what are included in the concepts of components marked with the reference numerals and signs.

[1] <Switching of Touch Detection Characteristics in Button Region and Display Region>

A touch panel display device (1A, FIG. 3) includes a touch panel display portion (3), a touch key input portion (4), and a touch panel controller (6) that performs touch detection by driving the touch panel display portion and the touch key input portion. The touch panel display portion includes a dot matrix-type display panel (10) and a touch panel (11) which are disposed so as to overlap each other, the touch panel having intersection capacitances (22) formed in a matrix at intersecting portions of a plurality of first driving electrodes (20) and a plurality of first detection electrodes (21). The touch key input portion includes a touch key pattern (12) and a touch sensor (13) which are disposed so as to overlap each other, the touch sensor having intersection capacitances (32) at intersecting portions of a second driving electrode (30) and second detection electrodes (31). The touch panel controller includes driving terminals (40 and 41) which are individually connected to the first driving electrodes and the second driving electrode, detection terminals (50 and 51) which are individually connected to the first detection electrodes and a portion of which is connected in common to the second detection electrodes, driving circuits (60) that provide driving voltages to the driving terminals in a predetermined order, detection circuits (70) that form detection signals by potential changes appearing in the plurality of detection terminals in synchronization with driving of the driving terminals, and a control circuit (90) capable of switching detection characteristics of the detection circuits in accordance with the detection from the touch panel display portion and the detection from the touch key input portion.

According to such a configuration, the cost of the touch panel display device can be reduced using the touch panel controller common to the use of display and buttons, and the difference in detection characteristics for the touch panel and the touch sensor serving as a switch can have no adverse effect on touch detection through switching control of detection characteristics.

[2] <Switching of Detection Characteristics by Calibration Data>

In [1], the detection circuit includes a calibration circuit (101) that cancels an offset component superimposed on the potential change appearing in the detection terminal on the basis of calibration data. The control circuit switches the calibration data in accordance with the detection from the touch panel display portion and the detection from the touch key input portion.

According to such a configuration, it is possible to simply switch the detection characteristics by the switching of the calibration data.

[3] <Selection of Calibration Data of Register Circuit>

In [2], the control circuit includes a register circuit that holds calibration data in a rewritable manner, and a selection circuit (206) that selects calibration data supplied from the register circuit (203 and 204) to the calibration circuit in accordance with the detection from the touch panel display portion and the detection from the touch key input portion.

According to such a configuration, it is possible to easily switch the calibration data.

[4] <Switching of Detection Characteristics Based on Integral Capacitance Value of Integration Circuit>

In [1] or [2], the detection circuit includes an integration circuit (100) that integrates the potential change appearing in the detection terminal. The control circuit switches an integral capacitance value of the integration circuit in accordance with the detection from the touch panel display portion and the detection from the touch key input portion.

According to such a configuration, it is possible to simply switch the detection characteristics by the switching of the integral capacitance value of the integration circuit.

[5] <Selection of Integral Capacitance Value Instruction Data of Register Circuit>

In [4], the integration circuit includes a variable capacitive element (102) that integrates the potential change. The control circuit includes a register circuit (201 and 201) that holds integral capacitance value instruction data of the variable capacitive element in a rewritable manner, and a selection circuit (205) that selects integral capacitance value instruction data supplied from the register circuit to the variable capacitive element in accordance with the detection from the touch panel display portion and the detection from the touch key input portion.

According to such a configuration, it is possible to easily switch the integral capacitance value.

[6] <Selection of Touch Scan Mode>

In [1], the control circuit is able to select a full scan mode in which a touch detection operation is performed by driving the driving terminals corresponding to both the touch panel display portion and the touch key input portion, a first partial scan mode in which a touch detection operation is performed by driving only the driving terminal corresponding to the touch panel display portion, or a second partial scan mode in which a touch detection operation is performed by driving only the driving terminal corresponding to the touch key input portion.

According to such a configuration, it is possible to perform touch detection in conjunction with the touch panel display portion serving as a display region and the touch key input portion serving as a button region, through the full scan mode. A selection that disables the touch key input portion serving as a button region from being used through the first partial scan mode can be made. It is possible to achieve a reduction in power consumption by performing a selection that disables an input from the display region through the second partial scan mode, in a case of simple moving image display.

[7] <Mode Register>

In [6], the control circuit includes a mode register (210) in which mode data for selecting the full scan mode, the first partial mode, or the second partial mode is set in a rewritable manner.

Thereby, it is possible to easily select the full scan mode, the first partial mode, or the second partial mode.

[8] <Touch Panel Controller that Switches Touch Detection Characteristics in Button Region and Display Region>

A touch panel controller (6, FIG. 3) performs touch detection by driving the touch panel display portion (3) and the touch key input portion (4). The touch panel display portion includes a dot matrix-type display panel (10) and a touch panel (11) which are disposed so as to overlap each other, the touch panel having intersection capacitances (22) formed in a matrix at intersecting portions of a plurality of first driving electrodes (20) and a plurality of first detection electrodes (21). The touch key input portion includes a touch key pattern (12) and a touch sensor (13) which are disposed so as to overlap each other, the touch sensor having intersection capacitances (32) at intersecting portions of a second driving electrode (30) and second detection electrodes (31). The touch panel controller includes driving terminals (40 and 41) which are individually connected to the first driving electrodes and the second driving electrode, detection terminals (50 and 51) which are individually connected to the first detection electrodes and a portion of which is connected in common to the second detection electrodes, driving circuits (60) that provide driving voltages to the driving terminals in a predetermined order, detection circuits (70) that form detection signals by potential changes appearing in the plurality of detection terminals in synchronization with driving of the driving terminals, and a control circuit (90) capable of switching detection characteristics of the detection circuits in accordance with the detection from the touch panel display portion and the detection from the touch key input portion.

According to such a configuration, the cost of the touch panel display device can be reduced using the touch panel controller common to the use of display and buttons, and the difference in detection characteristics for the touch panel and the touch sensor serving as a switch can have no adverse effect on touch detection through switching control of detection characteristics.

[9] <Individualization of Detection Circuit in the Touch Panel Display Portion and Touch Key Input Portion>

A touch panel display device (1B, FIG. 10) includes a touch panel display portion (3), a touch key input portion (4), and a touch panel controller (6B) that performs touch detection by driving the touch panel display portion and the touch key input portion. The touch panel display portion includes a dot matrix-type display panel (10) and a touch panel (11) which are disposed so as to overlap each other, the touch panel having intersection capacitances (22) formed in a matrix at intersecting portions of a plurality of first driving electrodes (20) and a plurality of first detection electrodes (21). The touch key input portion includes a touch key pattern (12) and a touch sensor (13) which are disposed so as to overlap each other, the touch sensor having intersection capacitances (32) at intersecting portions of a second driving electrode (30) and second detection electrodes (31). The touch panel controller includes driving terminals (40 and 41) which are individually connected to the first driving electrodes and the second driving electrode, detection terminals (50 and 52) which are individually connected to the first detection electrodes and the second detection electrodes, driving circuits (60) that provide driving voltages to the driving terminals in a predetermined order, detection circuits (71 and 72) that form detection signals by potential changes appearing in the plurality of detection terminals in synchronization with driving of the driving terminals, and a control circuit (91) that controls operations of the driving circuit and the detection circuit.

According to such a configuration, the cost of the touch panel display device can be reduced using the touch panel controller common to the use of display and buttons, and in case that detection parameter are individually set by adopting an individual detection circuit in each of the touch panel and the touch sensor, the difference in detection characteristics for the touch panel and the touch sensor serving as a switch can have no adverse effect on touch detection.

[10] <Optimization of Detection Characteristics of Detection Circuit for First Detection Electrode and Detection Circuit for Second Detection Electrode>

In [9], a difference exists between detection characteristics of the detection circuit connected to the detection terminal corresponding to the first detection electrode and detection characteristics of the detection circuit connected to the detection terminal corresponding to the second detection electrode.

According to such a configuration, it is possible to set detection characteristics suitable for an individual detection circuit in advance in each of the touch panel and the touch sensor.

[11] <Selection of Touch Scan Mode>

In [9], the control circuit is able to select a full scan mode in which the driving terminals corresponding to each of the touch panel display portion and the touch key input portion are driven and a touch detection operation is performed using an input from the detection terminals corresponding to each of the touch panel display portion and the touch key input portion, a first partial scan mode in which the driving terminal corresponding to the touch panel display portion is driven and a touch detection operation is performed using an input from the detection terminal corresponding to the touch panel display portion, or a second partial scan mode in which the driving terminal corresponding to the touch key input portion is driven and a touch detection operation is performed using an input from the detection terminal corresponding to the touch key input portion.

According to such a configuration, it is possible to perform touch detection in conjunction with the touch panel display portion serving as a display region and the touch key input portion serving as a button region, through the full scan mode. A selection that disables the touch key input portion serving as a button region from being used through the first partial scan mode can be made. It is possible to achieve a reduction in power consumption by performing a selection that disables an input from the display region through the first partial scan mode, in a case of simple moving image display.

[12] <Mode Register>

In [11], the control circuit includes a mode register (210) in which mode data for selecting the full scan mode, the first partial mode, or the second partial mode is set in a rewritable manner.

Thereby, it is possible to easily select the full scan mode, the first partial mode, or the second partial mode.

[13] <Touch Panel Controller in which Detection Circuit is Individualized in Touch Panel Display Portion and Touch Key Input Portion>

A touch panel controller (6B, FIG. 10) performs touch detection by driving a touch panel display portion (3) and a touch key input portion (4). The touch panel display portion includes a dot matrix-type display panel (10) and a touch panel (11) which are disposed so as to overlap each other, the touch panel having intersection capacitances (22) formed in a matrix at intersecting portions of a plurality of first driving electrodes (20) and a plurality of first detection electrodes (21). The touch key input portion includes a touch key pattern (12) and a touch sensor (13) which are disposed so as to overlap each other, the touch sensor having intersection capacitances (32) at intersecting portions of a second driving electrode (30) and second detection electrodes (31). The touch panel controller includes driving terminals (40 and 41) which are individually connected to the first driving electrodes and the second driving electrode, detection terminals (50 and 52) which are individually connected to the first detection electrodes and the second detection electrodes, driving circuits (60) that provide driving voltages to the driving terminals in a predetermined order, and detection circuits (71 and 72) that form detection signals by potential changes appearing in the plurality of detection terminals in synchronization with driving of the driving terminals.

According to such a configuration, the cost of the touch panel display device can be reduced using the touch panel controller common to the use of display and buttons, and in case that detection parameters are individually set by adopting an individual detection circuit in each of the touch panel and the touch sensor, the difference in detection characteristics for the touch panel and the touch sensor serving as a switch can have no adverse effect on touch detection.

[14] <Individualization of Detection Circuit in Touch Panel Display Portion and Touch Key Input Portion and Formation of a Portion of Driving Circuit in Common>

A touch panel display device (1C, FIG. 15) includes a touch panel display portion (3), a touch key input portion (4), and a touch panel controller (6C) that performs touch detection by driving the touch panel display portion and the touch key input portion. The touch panel display portion includes a dot matrix-type display panel (10) and a touch panel (11) which are disposed so as to overlap each other, the touch panel having intersection capacitances (22) formed in a matrix at intersecting portions of a plurality of first driving electrodes (20) and a plurality of first detection electrodes (21). The touch key input portion includes a touch key pattern (12) and a touch sensor (13) which are disposed so as to overlap each other, the touch sensor having intersection capacitances (32) at intersecting portions of a second driving electrode (30) and second detection electrodes (31). The touch panel controller includes detection terminals (50 and 52) which are individually connected to the first detection electrodes and the second detection electrodes, driving terminals (40 and 42) which are individually connected to the first driving electrodes and a portion of which is connected in common to the second driving electrode, driving circuits (60) that provide driving voltages to the driving terminals in a predetermined order, detection circuits (71 and 72) that form detection signals by potential changes appearing in the plurality of detection terminals in synchronization with driving of the driving terminals, and a control circuit (92) that controls operations of the driving circuit and the detection circuit.

According to such a configuration, the cost of the touch panel display device can be reduced using the touch panel controller common to the use of display and buttons, and in case that detection parameters are individually set by adopting an individual detection circuit in each of the touch panel and the touch sensor, the difference in detection characteristics for the touch panel and the touch sensor serving as a switch can have no adverse effect on touch detection. Since the driving circuit of the touch panel and the touch sensor is formed in common, it is possible to reduce the number of driving circuits to be used, as compared with a configuration in which the driving circuit of the touch panel and the touch sensor is individualized.

[15] <Optimization of Detection Characteristics of Detection Circuit for First Detection Electrode and Detection Circuit for Second Detection Electrode>

In [14], a difference exists between detection characteristics of the detection circuit connected to the detection terminal corresponding to the first detection electrode and detection characteristics of the detection circuit connected to the detection terminal corresponding to the second detection electrode.

According to such a configuration, it is possible to set detection characteristics suitable for an individual detection circuit in advance in each of the touch panel and the touch sensor.

[16] <Selection of Touch Scan Mode>

In [14], the control circuit is able to select a full scan mode in which the driving terminals corresponding to each of the touch panel display portion and the touch key input portion are driven and a touch detection operation is performed using an input from the detection terminals corresponding to each of the touch panel display portion and the touch key input portion, a first partial scan mode in which the driving terminal corresponding to the touch panel display portion is driven and a touch detection operation is performed using an input from the detection terminal corresponding to the touch panel display portion, or a second partial scan mode in which the driving terminal corresponding to the touch key input portion is driven and a touch detection operation is performed using an input from the detection terminal corresponding to the touch key input portion.

According to such a configuration, it is possible to perform touch detection in conjunction with the touch panel display portion serving as a display region and the touch key input portion serving as a button region, through the full scan mode. A selection that disables the touch key input portion serving as a button region from being used through the first partial scan mode can be made. It is possible to achieve a reduction in power consumption by performing a selection that disables an input from the display region through the first partial scan mode, in a case of simple moving image display.

[17] <Mode Register>

In [16], the control circuit includes a mode register (210) in which mode data for selecting the full scan mode, the first partial scan mode, or the second partial scan mode is set in a rewritable manner.

Thereby, it is possible to easily select the full scan mode, the first partial mode, or the second partial mode.

[18] <Touch Panel Controller in which Detection Circuit is Individualized in Touch Panel Display Portion and Touch Key Input Portion and Driving Circuit is Formed in Common>

A touch panel controller (6C, FIG. 15) performs touch detection by driving a touch panel display portion (3) and a touch key input portion (4). The touch panel display portion includes a dot matrix-type display panel (10) and a touch panel (11) which are disposed so as to overlap each other, the touch panel having intersection capacitances (22) formed in a matrix at intersecting portions of a plurality of first driving electrodes (20) and a plurality of first detection electrodes (21). The touch key input portion includes a touch key pattern (12) and a touch sensor (13) which are disposed so as to overlap each other, the touch sensor having intersection capacitances (32) at intersecting portions of a second driving electrode (30) and second detection electrodes (31). The touch panel controller includes detection terminals (50 and 52) which are individually connected to the first detection electrodes and the second detection electrodes, driving terminals (40 and 42) which are individually connected to the first driving electrodes and a portion of which is connected in common to the second driving electrode, driving circuits (60) that provide driving voltages to the driving terminals in a predetermined order, and detection circuits (71 and 72) that form detection signals by potential changes appearing in the plurality of detection terminals in synchronization with driving of the driving terminals.

According to such a configuration, the cost of the touch panel display device can be reduced using the touch panel controller common to the use of display and buttons, and in case that detection parameter are individually set by adopting an individual detection circuit in each of the touch panel and the touch sensor, the difference in detection characteristics for the touch panel and the touch sensor serving as a switch can have no adverse effect on touch detection. Since the driving circuit of the touch panel and the touch sensor is formed in common, it is possible to reduce the number of driving circuits to be used, as compared with a configuration in which the driving circuit of the touch panel and the touch sensor is individualized.

2. Further Detailed Description of the Embodiments

The embodiments will be described in detail.

FIG. 1 illustrates an appearance of a mobile terminal such as a tablet or a smartphone to which a touch panel display device is applied. A mobile terminal 1 shown in the same drawing has a touch panel display portion 3 formed on the surface of a housing 2 as a display region and a touch key input portion 4 formed thereon as a button region. A dot matrix-type display panel, for example, a liquid crystal panel 10 and a touch panel 11 are formed in the touch panel display portion 3 so as to overlap each other. A touch key pattern 12 and a touch sensor 13 are disposed in the touch key input portion 4 so as to overlap each other, and three buttons 4A, 4B, and 4C are formed therein.

Figure 2:
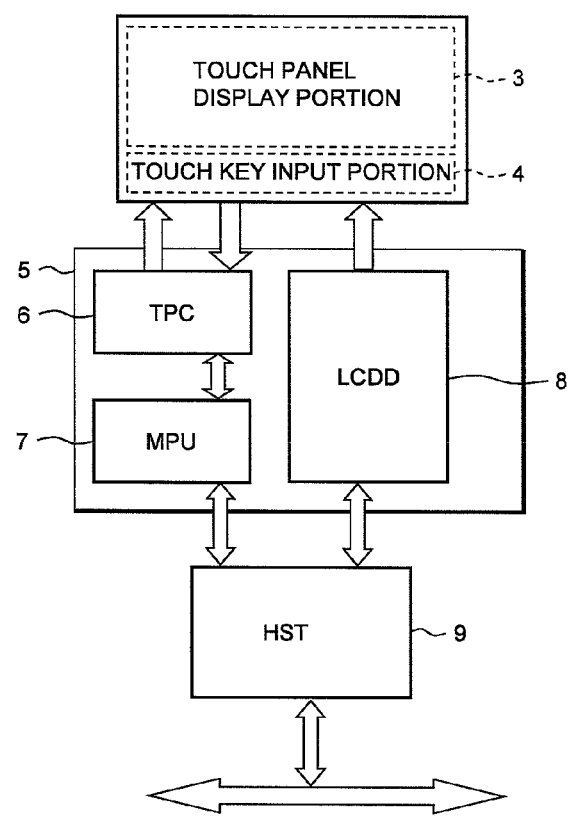
FIG. 2 is a block diagram illustrating a touch panel display device which is applied to the mobile terminal.

FIG. 2 illustrates a block diagram of the touch panel display device applied to the mobile terminal 1. The touch panel display device, although not particularly limited, is constituted by the touch panel display portion 3, the touch key input portion 4, and a controller device 5 that controls these portions. The controller device 5, not particularly limited, includes a touch panel controller (TPC) 6, a sub processor (MPU) 7, and a liquid crystal display driver (LCDD) 8, and is formed on one semiconductor substrate such as single crystal silicon by a CMOS integrated circuit manufacturing technique. The touch panel controller 6 performs touch detection by driving the touch panel display portion 3 and the touch key input portion 4. The sub processor 7 instructs the touch panel controller 6 to operate in accordance with a command provided from a host processor (HST) 9. Thus, the touch panel controller 6 performs a coordinate arithmetic operation on a touch position with respect to detection data acquired from the touch panel 11 of the touch panel display portion 3, and the touch panel controller 6 performs an arithmetic operation on the presence or absence of a touch with respect to detection data acquired from the touch sensor 13 of the touch key input portion 4. The host processor (HST) 9 generates display data, and the liquid crystal driver 8 performs display control for displaying the display data, received from the host processor 9, on the liquid crystal panel 10. The host processor 9 acquires data of position coordinates in case that a contact event is generated, from the sub processor 7, and analyzes an input based on the operation of the touch panel 11 from a relationship between the data of position coordinates and a display screen that performs display by providing the data to the liquid crystal driver 8.

Although not particularly limited, a communication control unit, an image processing unit, a voice process unit, other accelerators and the like, which are not shown, are connected to the host processor 9, and thus a mobile terminal is configured.

Figure 3:
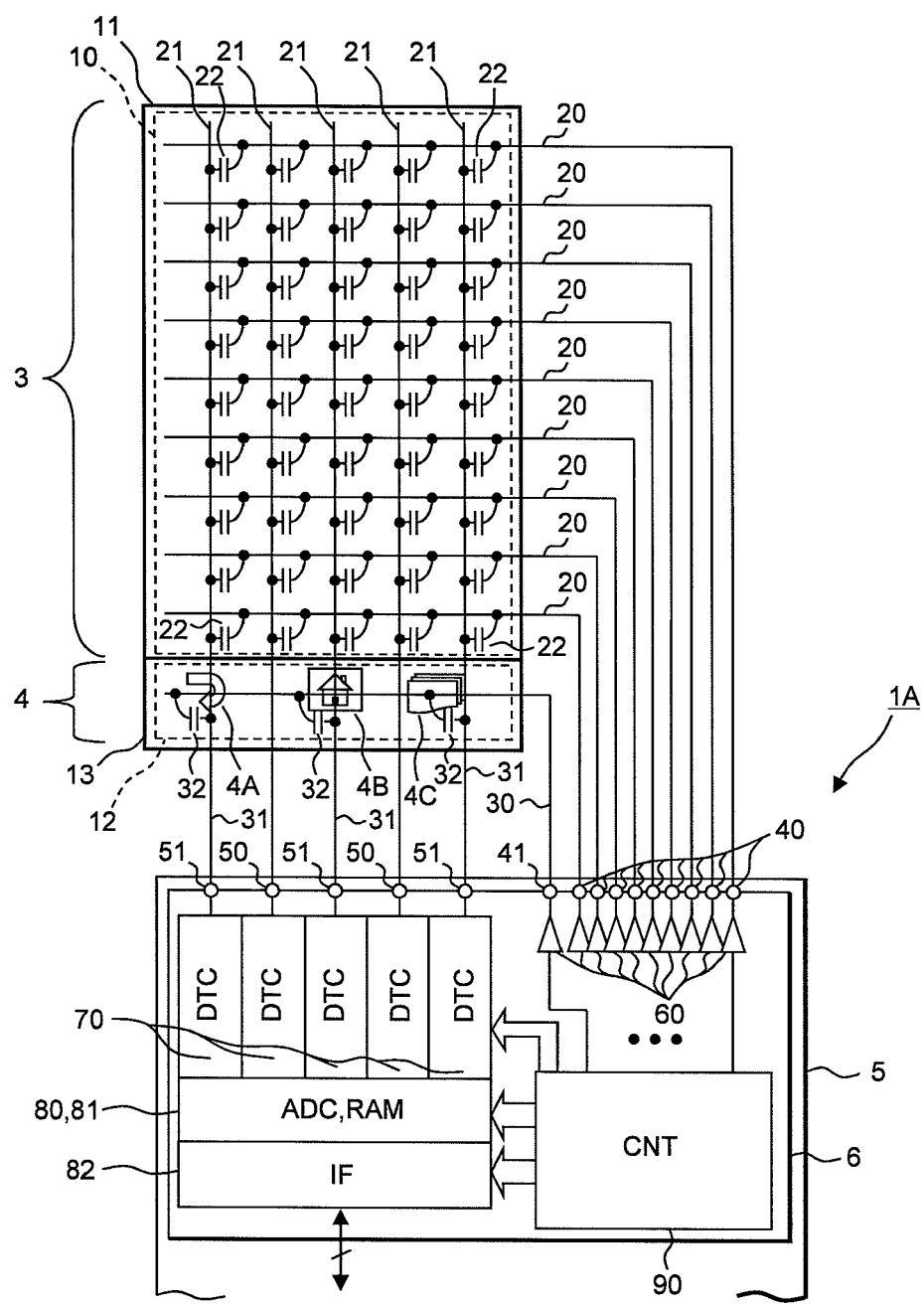
FIG. 3 is a block diagram illustrating a first detailed example of the touch panel display device.

FIG. 3 shows a first detailed example of the touch panel display device. A touch panel display device 1A shown in the same drawing is configured to form a detection circuit in common with respect to both the touch sensor 13 of the touch key input portion (button region) 4 and the touch panel 11 of the touch panel display portion (display region) 3, and to switch touch detection characteristics with respect to a difference in circuit characteristics of both.

Specifically, the touch panel 11 is configured such that intersection capacitances 22 are formed in a matrix at intersecting portions of a plurality of first driving electrodes 20 and a plurality of first detection electrodes 21. Here, five first detection electrodes are exemplified. The touch panel 11 is configured using a light-transmissive electrode and a dielectric film. For example, in the touch panel 11, either of an external structure having the touch panel disposed so as to overlap the display surface of the liquid crystal panel 10 or an in-cell structure having the touch panel 11 embedded in the liquid crystal panel 10 may be adopted.

The liquid crystal panel 10 disposed so as to overlap the touch panel 11 is configured such that, for example, a plurality of scanning electrodes formed in a transverse direction and a plurality of signal electrodes formed in a longitudinal direction are disposed, and a large number of liquid crystal display cells having selection terminals connected to the corresponding scanning electrodes and input terminals connected to the corresponding signal electrodes are disposed at the intersection portions thereof. Scanning pulses are applied to the scanning electrodes from the liquid crystal driver 8, for example, in the arrangement sequence and scanning driving is performed. Gradation data for one scanning line of the corresponding scanning electrode is supplied to the signal electrodes in synchronization with scanning driving of the scanning electrodes. Thereby, image display in frame units is performed.

The touch key pattern 12 forming three buttons 4A, 4B, and 4C formed therein is formed by printing or embossing. For example, the button 4A means a back button, the button 4B means a home button, and the button 4C means a function button.

The touch sensor 13 disposed so as to overlap the touch key pattern 12 is configured such that intersection capacitances 32 are formed at the intersecting portions of a second driving electrode 30 and second detection electrodes 31. Here, the number of second detection electrodes 31 is shown to be three, and three second detection electrodes are electrically connected to odd-numbered first detection electrodes 21 within five first detection electrodes 21.

The touch panel controller 6 includes driving terminals 40 and 41 which are individually connected to the first driving electrode 20 and the second driving electrode 30, and detection terminals 50 and 51 which are individually connected to the first detection electrode 21 and a portion of which is connected in common to the second detection electrode 31. The driving terminal 40 is connected to the first driving electrode 20, and the driving terminal 41 is connected to the second driving electrode 30. The even-numbered first detection electrodes 21 are connected to the detection terminal 50. The odd-numbered first detection electrodes 21 and the second detection electrode 31 are connected in common to the detection terminal 51. The touch panel controller 6 includes a driving circuit 60 that outputs a driving voltage to the driving terminals 40 and 41, and a detection circuit (DTC) 70 that forms a detection signal by a potential change appearing in each of the detection terminals 50 and 51. The detection signal formed in the detection circuit 70 is converted from an analog signal to a digital signal by an analog-to-digital conversion circuit (ADC) 80.

Figure 4:
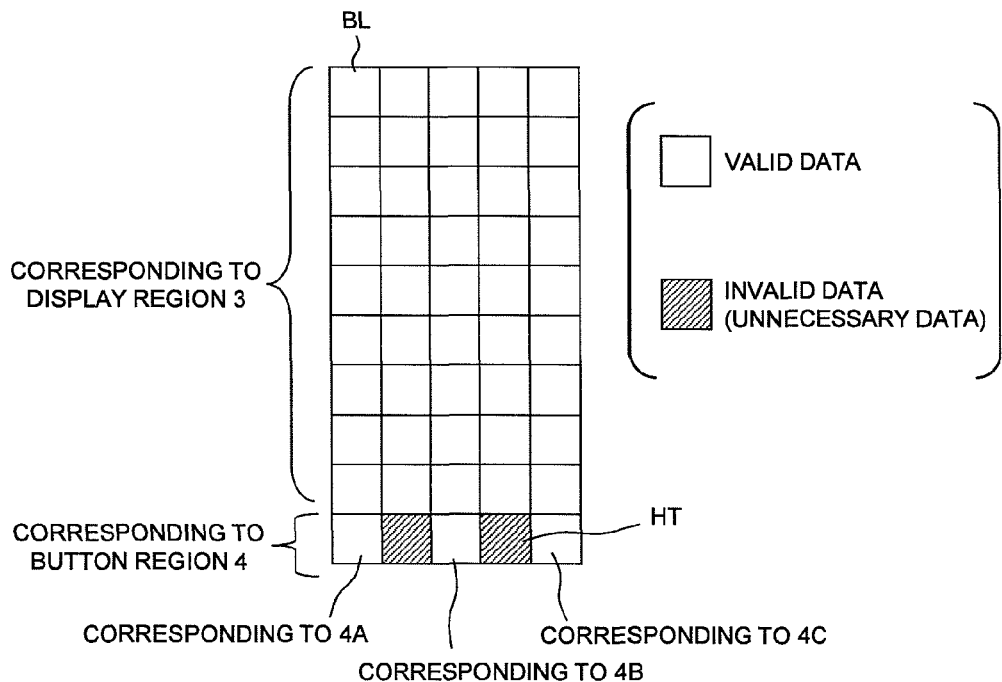
FIG. 4 is a diagram in which the arrangement of detection data on a RAM which is obtained from scanning of one surface of each of a touch panel display portion (display region) and a touch key input portion (button region) in FIG. 3 is schematically illustrated in association with the arrangement of intersection capacitances.

As described above, the first driving electrode 20 and the second driving electrode 30 of the touch panel 11 in the touch panel display portion 3 and the touch sensor 13 in the touch key input portion 4 are individualized, and have an arrangement structure in which a portion of the first detection electrodes 21 are connected in common to the second detection electrode 31. Therefore, data converted by the ADC 80 is stored in a RAM 81 in association with the arrangement of intersection capacitances 22 and 32 located at the intersection positions of the driving electrodes 20 and 30 and the detection electrodes 21 and 31. In FIG. 4, the arrangement of detection data on the RAM 81 which is obtained from scanning of one surface of each of the touch panel display portion (display region) 3 and the touch key input portion (button region) 4 is schematically shown in association with the arrangement of the intersection capacitances 22 and 32. Each hatched rectangular portion HT means unnecessary data (invalid data), and each non-hatched rectangular portion BL means valid data.

The data stored in the RAM 81 is read by the sub processor 7 through an external interface circuit (IF) 82, and is used for the sub processor 7 to perform a coordinate arithmetic operation, an arithmetic operation of the presence or absence of a touch, or the like.

Further, the touch panel controller 6 includes a control circuit (CNT) 90 that performs control of driving timing of driving circuits 60 and 61, operation control of the detection circuit 70, conversion control for the ADC 80, and writing control for the RAM 81, which synchronize with the driving timing, and interface control for the IF 82. Particularly, the control circuit 90 has a control function of switching detection characteristics of the detection circuit 70 in accordance with detection from the touch panel 11 in the touch panel display portion 3 and detection from the touch sensor 13 in the touch key input portion 4.

Figure 5:
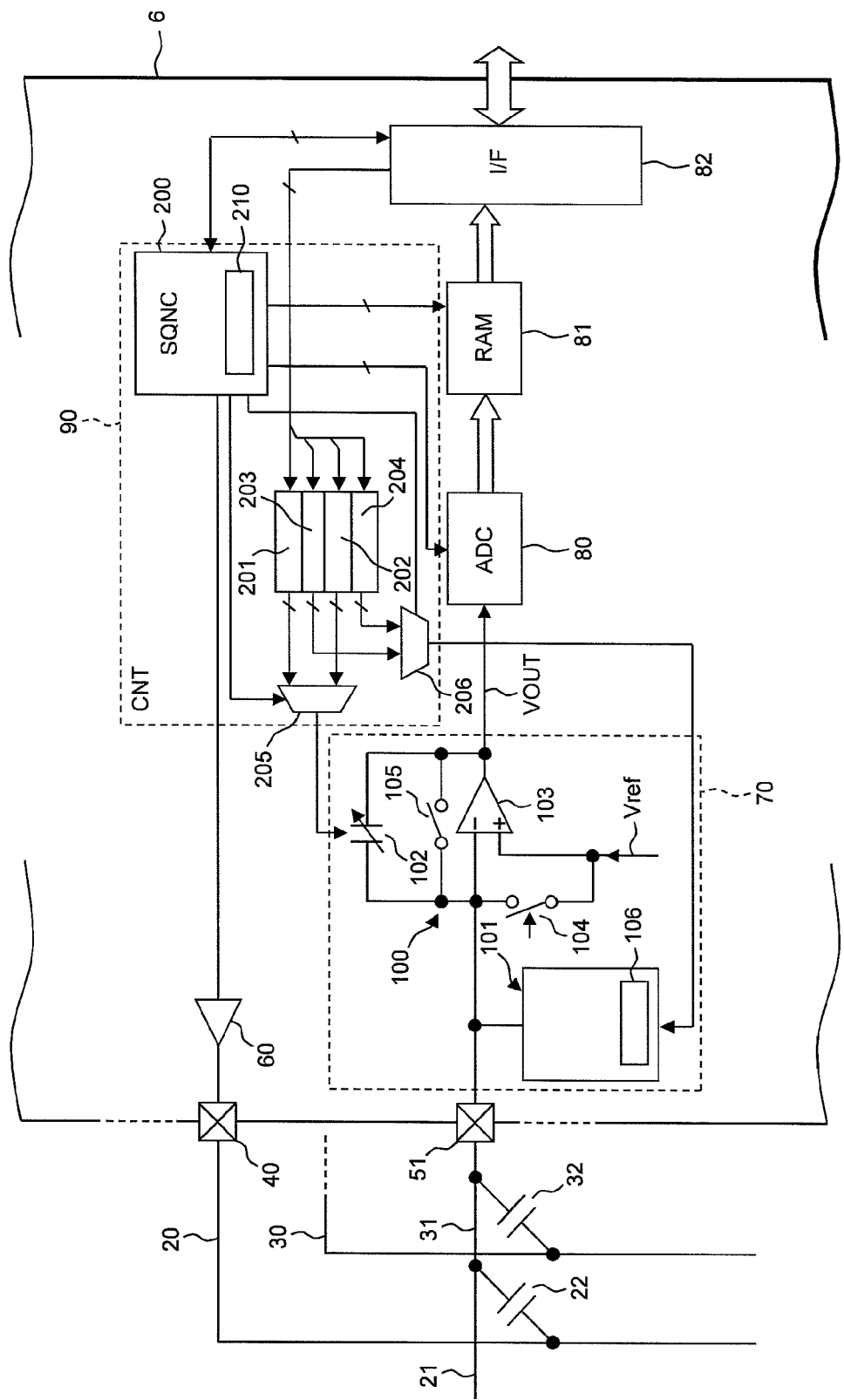
FIG. 5 is a block diagram illustrating a specific example of a detection circuit and a control circuit.

FIG. 5 shows a specific example of the detection circuit 70 and the control circuit 90. The same drawing shows one circuit configuration as the detection circuit 70 which is connected to the detection terminal 51. The detection electrode 21 and the detection electrode 31 are connected in series to the detection terminal 51 at the touch panel 11 side, and a capacitive electrode of the intersection capacitance 32 constituting, for example, the button 4C is coupled to the detection electrode 31 and the driving electrode 30 intersecting the detection electrode 31. A capacitive electrode of the intersection capacitance 22 is coupled to the detection electrode 21 connected in series to the detection electrode 31 and the driving electrode 20 intersecting the detection electrode 21. The detection circuit 70 is connected to the detection terminal 51 at the touch panel controller 6 side. The detection circuit 70 includes an integration circuit 100 and a calibration circuit 101. The integration circuit 100 is constituted by, for example, a charge switch 104 that supplies a precharge voltage Vref for charging the detection electrodes 21 and 31 to the detection electrodes 21 and 31 through the detection terminal 51, an operational amplifier 103 which is supplied with the precharge voltage Vref to a non-inverted input terminal (+) and to which the detection terminal 51 corresponding to an inverted input terminal (−) is connected, an integral capacitance 102, a reset switch 105 of the integral capacitance 102, and the like. The precharge voltage Vref is a reference voltage of a touch detection operation, and is a voltage approximately equal to a power supply voltage of the circuit. A driving pulse having a predetermined number of plural pulses is supplied for one driving electrode from the driving circuit 60 to the driving electrodes 20 and 30. The supply of the driving pulse to the driving electrodes 20 and 30 for one frame with respect to one surface each of the display region 3 and button region 4 is sequentially switched without overlapping driving electrodes to be driven, for each of the predetermined number of plural pulses per one driving electrode. FIG. 6 illustrates a detection operation timing of the integration circuit 100 in synchronization with a change in the driving pulse supplied to the driving electrode 20. First, the charge switch 104 is set to be in an on-state, transition to a non-detection state a in which the precharge voltage Vref is applied to the detection electrodes 21 and 31 is performed, the reset switch 105 is set to be in an on-state, and the integral capacitance 102 is reset. Next, the switches 104 and 102 are set to be in an off-state, and transition to a detection standby state b is performed. In the detection standby state b, the detection electrodes 21 and 31 are in a state where these electrodes are not connected to the precharge voltage Vref, but the voltage level of the inverted input terminal (−) of the operational amplifier 103 having a configuration of a virtual ground is held as it is. After transition to the detection standby state b, a rising pulse of an amplitude Vy is first input as a driving pulse to the driving electrode 20 (other driving electrodes are fixed to a low level). As a result, charges (=Vy×Cxy) migrate to the detection electrode 21 through the intersection capacitances (the capacitance value is referred to as Cxy) 22 of the driving electrode 20, and an output voltage VOUT of the operational amplifier 103 receiving the charges in the inverted input terminal (−) decreases by as much as a voltage in response to the migrating charges. When a finger or the like is present in the vicinity of the intersection capacitance 22, a synthetic capacitance value of the intersecting portion is reduced due to floating capacitance caused thereby. For example, in case that the synthetic capacitance value of the intersecting portion of the detection electrode 21 is reduced as much as a capacitance value Cf, charges which are input to the operational amplifier 103 of the detection electrode 21 become Vy×(Cxy−Cf), and a decrease in the level of the output VOUT of the operational amplifier 103 becomes smaller than in a case where a finger is not present in the intersecting portion. A distinction between touch and non-touch in the intersecting portion can be made depending on the difference between the output voltages. In reality, the output voltage VOUT is converted into detection data of a digital value by the ADC 80, is buffered to the RAM 81 in correlation with the arrangement of the intersection capacitances 22, and is used for the sub processor 7 to perform a coordinate arithmetic operation or the like, for example, in detection frame units.

As described above, the circuit configurations of the touch panel display portion 3 in which the liquid crystal panel 10 and the touch panel 11 overlap each other or are formed integrally and the touch key input portion 4 in which the touch key pattern 12 and the touch sensor 13 overlap each other are greatly different from each other and also in their circuit characteristics. Furthermore, a circuit load connected to the detection circuit 70 through the detection terminal 50 and a circuit load connected to the detection circuit 70 through the detection terminal 51 are also different from each other. Therefore, the detection circuit 70 is configured so that the detection characteristics can be switched using the calibration circuit 101, depending on whether at least a detection object is located on the touch panel display portion 3 side or the touch key input portion 4 side even in the same detection circuit 70. Further, the detection characteristics can also be switched by selecting the capacitance value of the integral capacitance 102.

The calibration circuit 101 is a circuit that provides an offset voltage to the precharge voltage Vref of the inverted input terminal (−) of the operational amplifier 103, and is a circuit that applies the offset voltage to the inverted input terminal (−) of the operational amplifier 103 so that the voltage range of the output voltage VOUT falls within a desired range even with respect to a detection operation for any position of the intersection capacitances 22 and 32. The offset voltage generated by the calibration circuit 101 is determined by calibration data stored in a calibration RAM 106. The calibration data becomes different depending on the positions of the detection terminals 50 and 51, and becomes greatly different depending on whether a detection object is the touch panel 11 or the touch sensor 13, even with respect to the same detection terminal. The same is true of a capacitance value which is set in the integral capacitance 102, and the capacitance value of the integral capacitance 102 constituted by variable capacitive elements becomes greatly different depending on whether a detection object is the touch panel 11 or the touch sensor 13. For example, in a detection system having large load capacitance, it is preferable to increase an offset value and an integral capacitance value based on the calibration data.

The control circuit 90 executes control for performing touch detection by driving the touch panel display portion 3 and the touch key input portion 4, and particularly controls the switching of the detection characteristics as described above. Specifically, the control circuit 90 includes a sequencer 200 that generates a control timing in the inside of the touch panel controller 6, registers 201 to 204, selectors 205 and 206, and the like. The registers 201 to 204 are rewritable by the sub processor 7 through the interface circuit 82. Integral capacitance value instruction data supplied to the variable capacitive element 102 during detection from the touch panel display portion 3 is held in the register 201. Integral capacitance value instruction data supplied to the variable capacitive element 102 during detection from the touch key input portion 4 is held in the register 202. Calibration data supplied to the calibration RAM 106 during detection from the touch panel display portion 3 is held in the register 203. Calibration data supplied to the calibration RAM 106 during detection from the touch key input portion 4 is held in the register 204. The selector 205 supplies the capacitance value instruction data held in the register 201 or 202 to the variable capacitive element 102 through control of the sequencer 200. The selector 206 selects the calibration data held in the register 203 or 204 through control of the sequencer 200 and supplies the data to the calibration RAM 106. The sequencer 200 selectively controls the selectors 205 and 206 in synchronization with a timing at which driving pulses are sequentially output to the driving terminal 60 in detection frame units of the touch panel display portion 3 and the touch key input portion 4. Ina period (scanning period of the display region 3) in which the driving electrode 20 of the touch panel 11 in the touch panel display portion 3 is driven, data of the registers 201 and 203 is selected. Ina period (scanning period of the button region 4) in which the driving electrode 30 of the touch sensor 13 in the touch key input portion 4 is driven, data of the registers 202 and 204 is selected.

Figure 7:
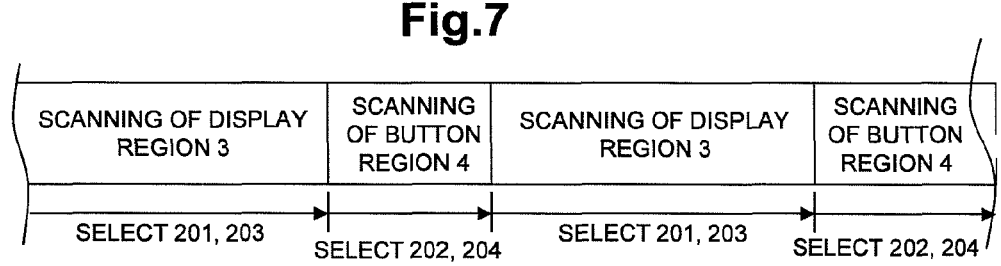
FIG. 7 is an operation diagram illustrating register selection states of a scanning period of the display region and a scanning period of the button region in a full scan mode.
Figure 8:
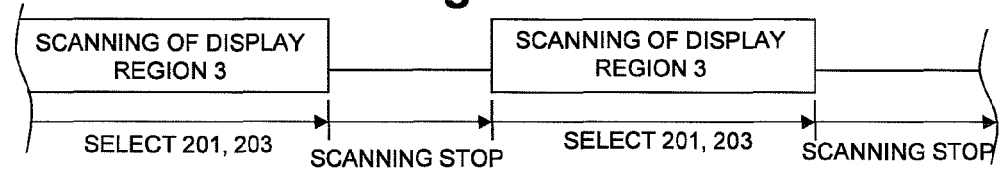
FIG. 8 is an operation diagram illustrating register selection states of a scanning period of the display region and a scanning period of the button region in a first partial scan mode.
Figure 9:
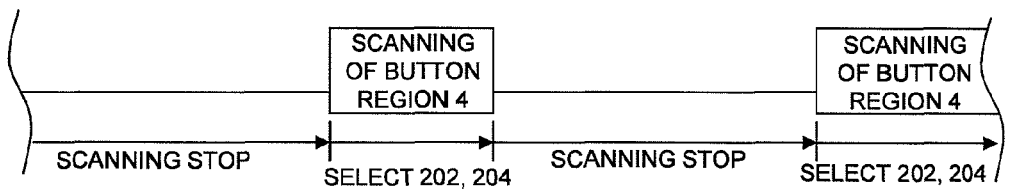
FIG. 9 is an operation diagram illustrating register selection states of a scanning period of the display region and a scanning period of the button region in a second partial scan mode.

FIG. 7 shows a relationship between register selection states in the scanning period of the display region 3 and the scanning period of the button region 4. The operation in FIG. 7 is an operation based on a full scan mode in which a touch detection operation is performed by driving the driving terminals corresponding to both the touch panel display portion and the touch key input portion. On the other hand, the operation in FIG. 8 is an operation based on a first partial scan mode in which a touch detection operation is performed by driving only the driving terminal corresponding to the touch panel display portion. The operation in FIG. 9 is an operation based on a second partial scan mode in which a touch detection operation is performed by driving only the driving terminal corresponding to the touch key input portion. Whether to select any of the operation modes is determined by mode data which is set in a mode register 210, provided to the sequencer 200, by the sub processor 7 in a rewritable manner through the interface circuit 82. The sequencer 200 controls driving of the driving electrode for a detection frame and a detection operation from the detection electrode in the full scan mode, the first partial mode, or the second partial mode specified by the mode data written in the mode register 210.

Meanwhile, in FIG. 5, one circuit is illustrated as the detection circuit 70, but other detection circuits 70 are configured similarly. Although not particularly shown, the output voltages VOUT of a plurality of detection circuits 70 are supplied to analog input terminals of the ADCs 80 in order through selectors. In addition, in FIG. 3, the driving circuit 60 that drives the driving electrode 30 and the driving circuit 60 that drives the driving electrode 20 are denoted by the same reference numerals and described, but both the driving circuits are not limited to be the same as each other, and the driving capability of the former may be set to be multiple times the latter.

According to the above-mentioned touch panel display device 1A, it is possible to obtain the following operations and effects.

(1) The cost of the touch panel display device 1A can be reduced using the touch panel controller 6 common to the display region (touch panel display portion) 3 and the button region (touch key input portion) 4, and the difference in detection characteristics for the touch panel 11 and the touch sensor 13 serving as a switch can have no adverse effect on touch detection through switching control of the detection characteristics.

(2) It is possible to simply switch the detection characteristics by switching the calibration data in accordance with detection from the touch panel display portion 3 and detection from the touch key input portion 4. The calibration data of the register circuits 203 and 204 are selected, and thus it is possible to easily switch the calibration data.

(3) It is possible to simply switch the detection characteristics by switching the integral capacitance value of the integration circuit 100 in accordance with detection from the touch panel display portion 3 and detection from the touch key input portion 4. The integral capacitance value instruction data of the register circuits 201 and 201 is selected, and thus it is possible to easily switch the integral capacitance value.

(4) It is possible to perform touch detection in conjunction with the display region (touch panel display portion) 3 and the button region (touch key input portion) 4, through the full scan mode. A selection that disables the button region from being used through the first partial scan mode can be made. It is possible to achieve a reduction in power consumption by performing a selection that disables an input from the display region through the second partial scan mode, in a case of simple moving image display. The scan mode is selected by the mode data of the mode register 210, and thus it is possible to easily select the full scan mode, the first partial mode, or the second partial mode.

Figure 10:
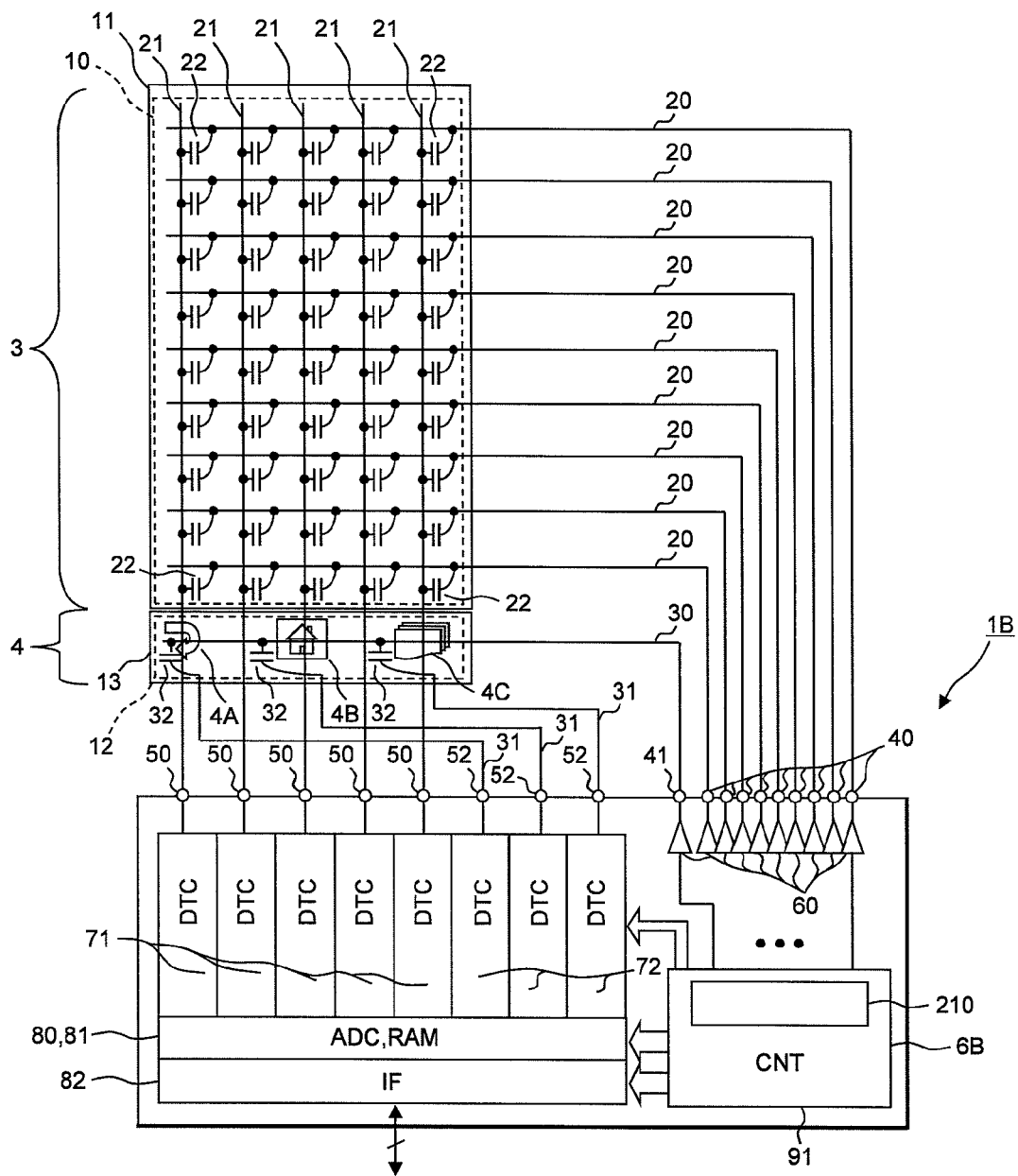
FIG. 10 is a block diagram illustrating a second detailed example of the touch panel display device.

FIG. 10 shows a second detailed example of the touch panel display device. In a touch panel display device 1B shown in the same drawing, a touch panel controller 6B is adopted in which detection circuits and driving circuits are individualized with respect to both the touch sensor 13 of the touch key input portion (button region) 4 and the touch panel 11 of the touch panel display portion (display region) 3. As is the case with FIG. 3, the driving electrodes 20 of the display region 3 are individually coupled to the driving terminals 40, and the driving electrode 30 is coupled to the driving terminal 41 of the button region 4. On the other hand, the detection electrodes 21 of the display region 3 are individually coupled to the detection terminals 50, and the detection electrodes 31 of the button region 4 are individually coupled to the detection terminals 52.

The touch panel controller 6B includes a detection circuit (DTC) 71 connected to the detection electrode 50 and a detection circuit (DTC) 72 connected to the detection electrode 52. The detection circuits 71 and 72 are constituted by the integration circuit 100 and the calibration circuit 101 which are described in FIG. 5. However, the integral capacitance 102 is not required to be a variable capacitive element, and the calibration circuit 101 does not require to switch the calibration data in the scanning of the display region 3 and the scanning of the button region 4. In short, the detection characteristics of the detection circuit 71 are optimized with respect to the circuit characteristics of the touch panel 11 of the display region 3, and the detection characteristics of the detection circuit 72 are optimized with respect to the circuit characteristics of the touch sensor 13 of the button region 4. Thereby, it is not required to switch the detection characteristics in the scanning of the display region 3 and the scanning of the button region 4. Therefore, a control circuit 91 does not include a configuration for switching the detection characteristics with respect to the control circuit 90 of FIG. 5. Other configurations are the same as those described in FIGS. 3 and 5. Components having the same function are denoted by the same reference numerals and signs, and the detailed description thereof will be omitted.

Figure 11:
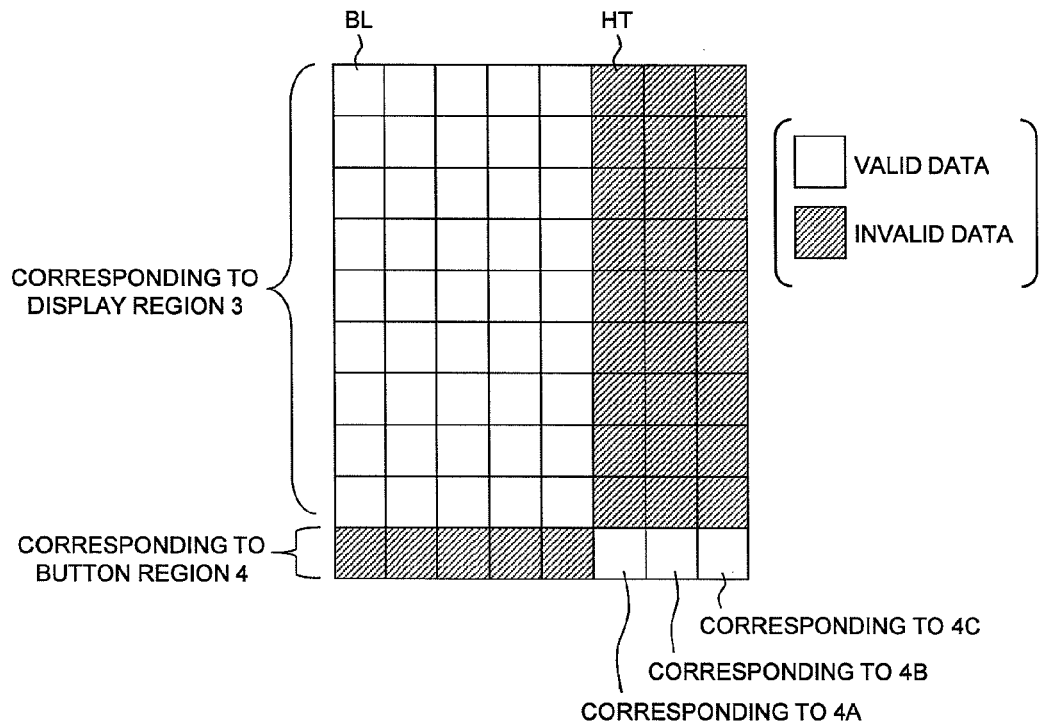
FIG. 11 is a diagram in which the arrangement of detection data on a RAM which is obtained from scanning of one surface of each of the touch panel display portion (display region) and the touch key input portion (button region) in FIG. 10 is schematically illustrated in association with each of a number of parallel detection circuits.
Figure 17:
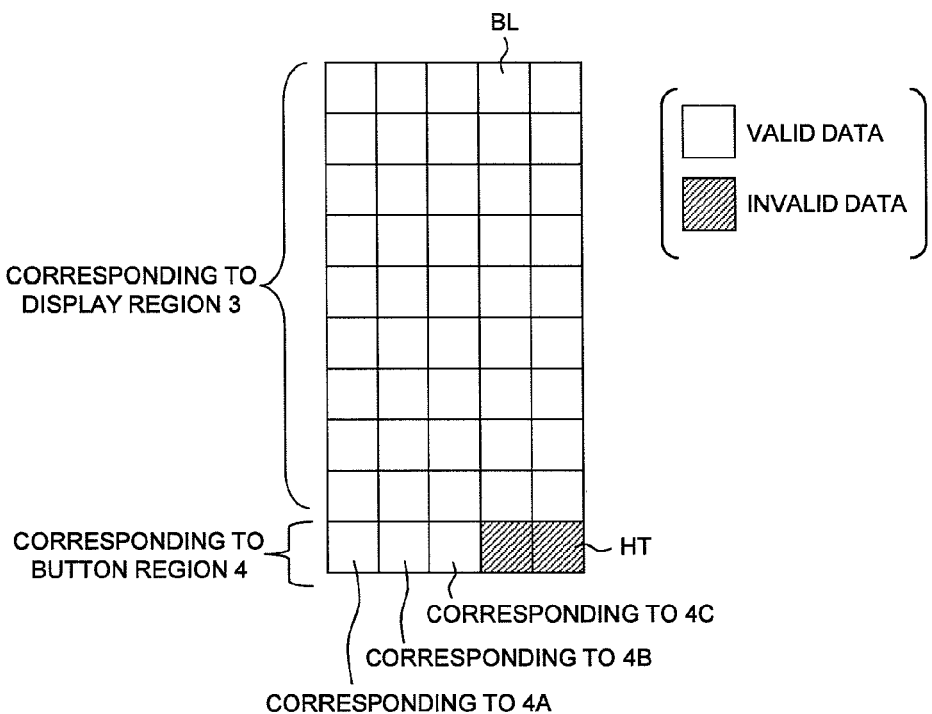
FIG. 17 is a diagram illustrating a data storage form obtained by reducing the number of regions of invalid data with respect to a data storage form of FIG. 11.

Detection data obtained by converting detection signals by the ADC 80 which are obtained in the detection circuits 71 and 72 individualized in the detection electrode 21 of the display region 3 and the detection electrode 31 of the button region 4 is stored in the RAM 81 for each of a number of parallel detection circuits 71 and 72 arranged in parallel. In FIG. 11, the arrangement of detection data on the RAM 81 which is obtained from the scanning of one surface of each of the touch panel display portion (display region) 3 and the touch key input portion (button region) 4 is schematically illustrated in association with each of a number of parallel detection circuits 71 and 72. Each hatched rectangular portion HT means unnecessary data (invalid data), and each non-hatched rectangular portion BL means valid data. As obvious from FIG. 11, here shown is a case where the detection operations of all the detection circuits 71 and 72 are performed in synchronization with sequential driving of the driving electrodes 20 and 30. Thus, with respect to data obtained in the detection circuits 71 and 72 in synchronization with the sequential driving of the driving electrodes 20 and 30, detection data of the detection circuit 52 becomes invalid in the scanning of the display region 3, and detection data of the detection circuit 50 becomes invalid in the scanning of the button region 4. Although not particularly limited, in a data storage method shown in FIG. 11, it is considered that the number of invalid data HT becomes large and the use efficiency of the RAM 81 deteriorates. In order to improve this, for example, as exemplified in FIG. 17, the detection data from the button region 4 may be stored on an extended storage memory address of valid data by performing address conversion on the detection data from the button region 4 during writing. Thereby, it is possible to reduce the number of regions of invalid data, and to reduce a storage region having a size of 8×10 required in FIG. 11 to a size of 5×10.

The control circuit 91 generates control signals for a conversion operation of the ADC 80 and an access operation of the RAM 81, together with the detection operations of the detection circuits 71 and 72 that synchronize with a control timing within the touch panel controller 6B, that is, the driving of the driving electrodes 20 and 30 by the driving circuits 40 and 41.

The control circuit 91 includes a mode register 210. The mode register 210 is a register in which mode data is set in a rewritable manner, the mode data for selecting a full scan mode in which a touch detection operation is performed by driving the driving terminals 40 and 41 corresponding to both the touch panel display portion 3 and the touch key input portion 4, a first partial scan mode in which a touch detection operation is performed by driving only the driving terminal 40 corresponding to the touch panel display portion 3, or a second partial scan mode in which a touch detection operation is performed by driving only the driving terminal 41 corresponding to the touch key input portion 4. The control circuit 91 controls driving of the driving electrode for a detection frame and a detection operation from the detection electrode in the full scan mode, the first partial mode, or the second partial mode specified by the mode data written in the mode register 210. Whether to select any of the operation modes is determined by the mode data which is set in the mode register 210 by the sub processor 7 in a rewritable manner through the interface circuit 82.

Figure 12:
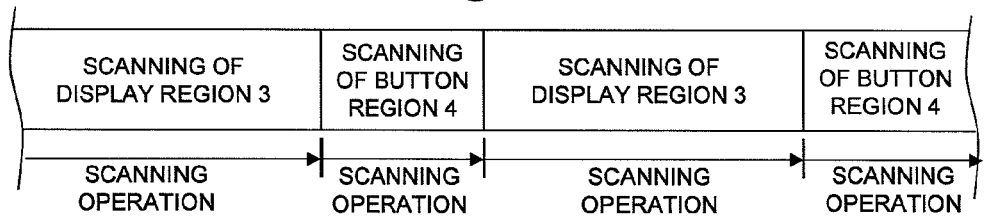
FIG. 12 is an operation diagram based on the full scan mode.
Figure 13:
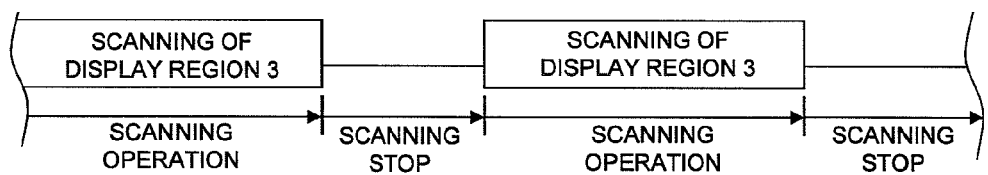
FIG. 13 is an operation diagram based on the first partial scan mode.
Figure 14:
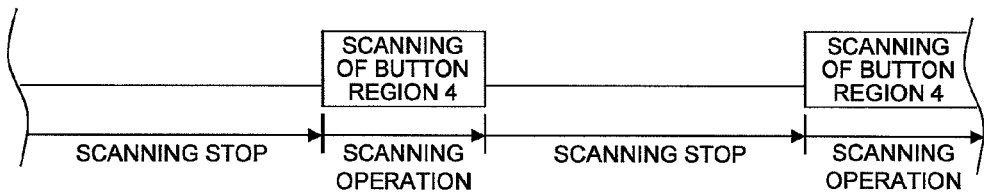
FIG. 14 is an operation diagram based on the second partial scan mode.

FIG. 12 illustrates an operation based on the full scan mode. FIG. 13 is an operation based on the first partial scan mode. FIG. 14 is an operation based on the second partial scan mode. As shown in each of the drawings, low power consumption is achieved by selecting the scanning of the display region 3 and the scanning of the button region 4 depending on operation modes. Further, in the operation modes of each drawing, in the scanning of the display region 3, only the driving terminal 40 is driven within the driving terminals 40 and 41 and only the detection circuit 71 is brought into operation within the detection circuits 71 and 72, and in the scanning of the button region 4, only the driving terminal 41 is driven within the driving terminals 40 and 41 and only the detection circuit 72 is brought into operation within the detection circuits 71 and 72. Thereby, it is possible to realize lower power consumption in each operation mode.

According to the above-mentioned touch panel display device 1B, it is possible to obtain the following operations and effects.

(1) Since the cost of the touch panel display device 1B can be reduced using the touch panel controller 6B common to the use of display and buttons, and detection parameters can be individually set by adopting the individual detection circuits 71 and 72 in each of the touch panel 11 and the touch sensor 13, the difference in detection characteristics for the touch panel 11 and the touch sensor 13 serving as a switch can have no adverse effect on touch detection.

(2) Since the detection circuit 70 for the touch panel 11 and the detection circuit 71 for the touch switch 13 are individualized, it is easy to set detection characteristics suitable for the detection circuit in advance.

(3) It is possible to perform touch detection in conjunction with the display region (touch panel display portion) 3 and the button region (touch key input portion) 4, through the full scan mode. A selection that disables the button region from being used through the first partial scan mode can be made. It is possible to achieve a reduction in power consumption by performing a selection that disables an input from the display region through the second partial scan mode, in a case of simple moving image display. The scan mode is selected by the mode data of the mode register 210, and thus it is possible to easily select the full scan mode, the first partial mode, or the second partial mode.

Figure 15:
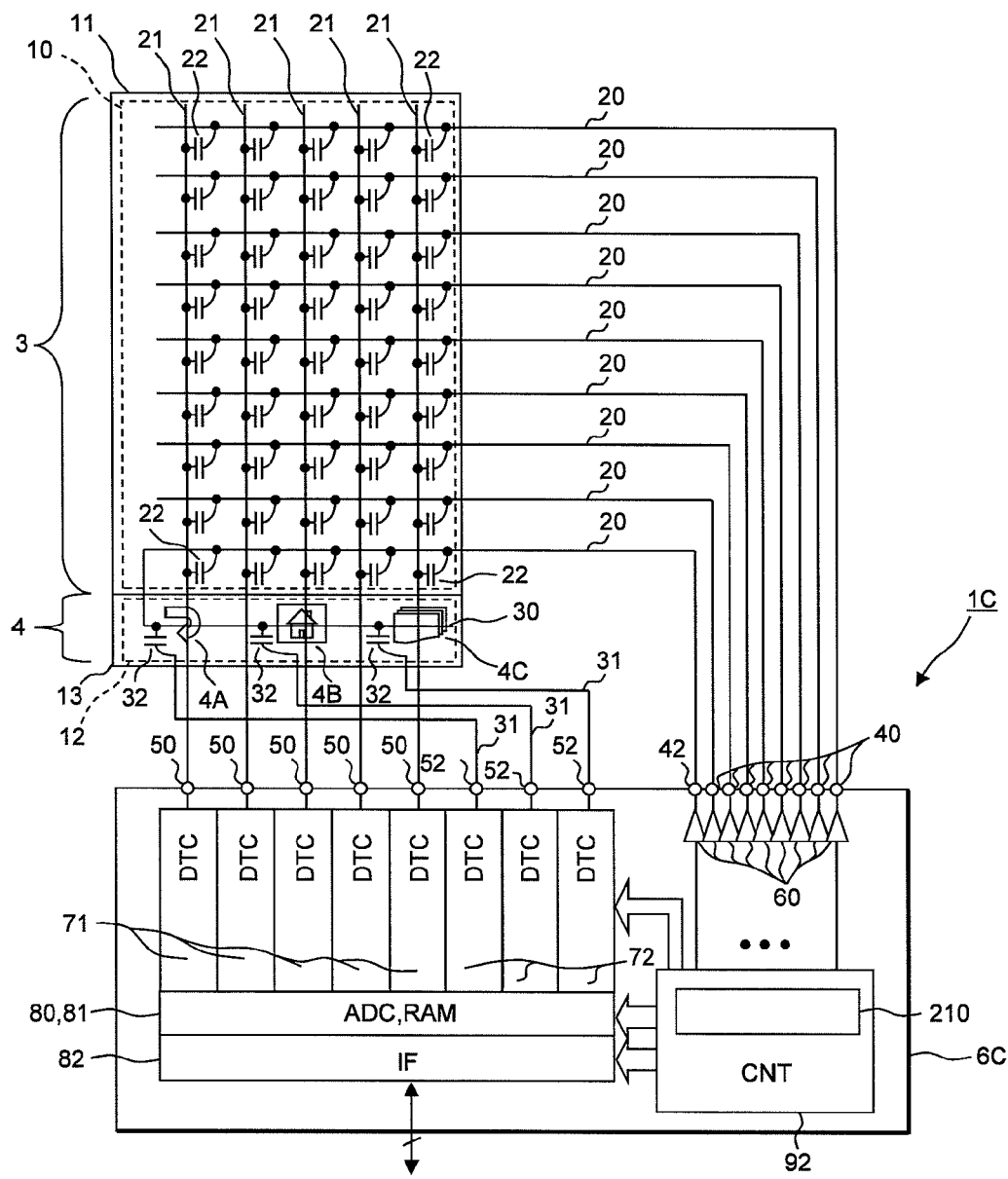
FIG. 15 is a block diagram illustrating a third detailed example of the touch panel display device.

FIG. 15 illustrates a third detailed example of the touch panel display device. In a touch panel display device 10 shown in the same drawing, a touch panel controller 60 is adopted in which detection circuits are individualized and driving circuits are formed in common, with respect to both the touch sensor 13 of the touch key input portion (button region) 4 and the touch panel 11 of the touch panel display portion (display region) 3. As is the case with FIG. 10, the detection electrodes 21 of the display region 3 are individually coupled to the detection terminals 50, and the detection electrodes 31 of the button region 4 are individually coupled to the detection terminals 52. On the other hand, the second driving electrode 30 of the touch sensor 13 and the first driving electrode 20 of the touch panel 11 which are adjacent to the touch key input portion (button region) 4 and the touch panel display portion (display region) 3 are connected in common to each other, and these electrodes are connected in common to one driving terminal 42. The remaining driving electrodes 20 are individually connected to the driving terminals 40. Therefore, the second driving electrode 30 connected to the first driving electrode 20 is driven by the driving terminal 42 at the same time.

The touch panel controller 6C includes a detection circuit (DTC) 71 connected to the detection electrode 50 and a detection circuit (DTC) 72 connected to the detection electrode 52. The detection circuits 71 and 72 are constituted by the integration circuit 100 and the calibration circuit 101 which are described in FIG. 5. However, the integral capacitance 102 is not required to be a variable capacitive element, and the calibration circuit 101 does not require to switch the calibration data in the scanning of the display region 3 and the scanning of the button region 4. In short, the detection characteristics of the detection circuit 71 are optimized with respect to the circuit characteristics of the touch panel 11 of the display region 3, and the detection characteristics of the detection circuit 72 are optimized with respect to the circuit characteristics of the touch sensor 13 of the button region 4. Thereby, it is not required to switch the detection characteristics in the scanning of the display region 3 and the scanning of the button region 4. Therefore, a control circuit 92 does not include a configuration for switching the detection characteristics with respect to the control circuit 90 of FIG. 5.

Figure 16:
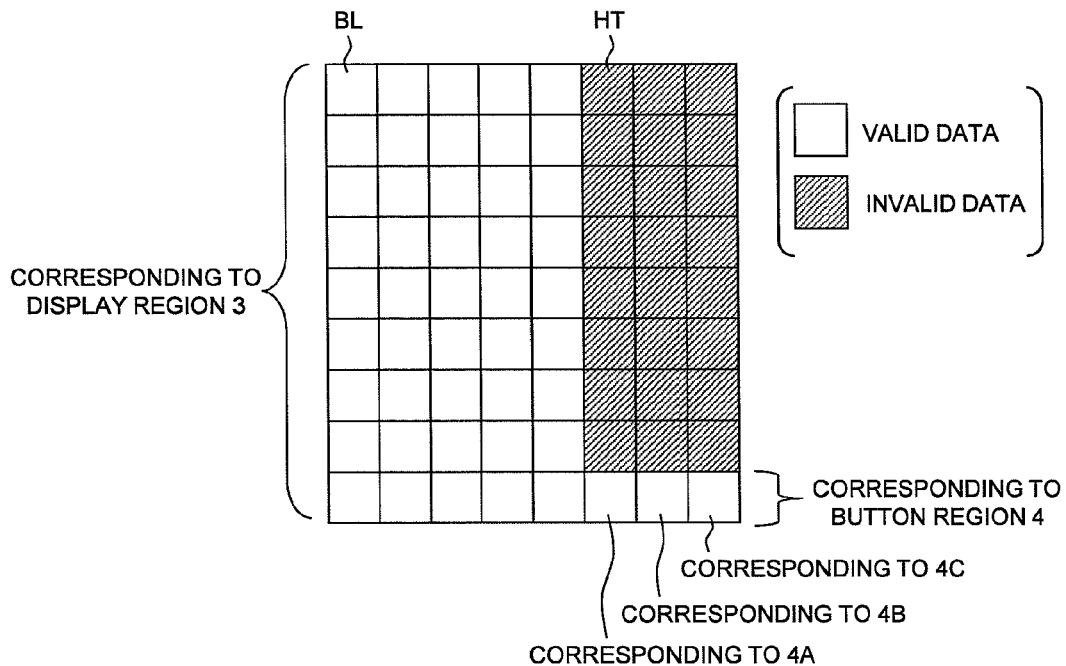
FIG. 16 is a diagram in which the arrangement of detection data on a RAM which is obtained from scanning of one surface of each of the touch panel display portion (display region) and the touch key input portion (button region) in FIG. 15 is schematically illustrated in association with each of a number of parallel detection circuits.

Detection data obtained by converting detection signals by the ADC 80 which are obtained in the detection circuits 71 and 72 individualized in the detection electrode 21 of the display region 3 and the detection electrode 31 of the button region 4 is stored in the RAM 81 for each of a number of parallel detection circuits 71 and 72 arranged in parallel. In FIG. 16, the arrangement of detection data on the RAM 81 which is obtained from the scanning of one surface of each of the touch panel display portion (display region) 3 and the touch key input portion (button region) 4 is schematically illustrated in association with each of a number of parallel detection circuits 71 and 72. Each hatched rectangular portion HT means unnecessary data (invalid data), and each non-hatched rectangular portion BL means valid data. As obvious from FIG. 16, here shown is a case where the detection operations of all the detection circuits 71 and 72 are performed in synchronization with sequential driving of the driving electrodes 20 and 30. Thus, with respect to data obtained in the detection circuits 71 and 72 in synchronization with the sequential driving of the driving electrodes 20 and 30, detection data of the detection circuit 52 becomes invalid in the scanning of the display region 3, but detection data of both the detection circuits 50 and 52 becomes valid in the scanning of the button region 4.

The control circuit 91 generates control signals for a conversion operation of the ADC 80 and an access operation of the RAM 81, together with the detection operations of the detection circuits 71 and 72 that synchronize with a control timing within the touch panel controller 6C, that is, the driving of the driving electrodes 20 and 30 by the driving circuits 40 and 42.

The control circuit 92 includes a mode register 210. The mode register 210 is a register in which mode data is set in a rewritable manner, the mode data for selecting a full scan mode in which a touch detection operation is performed by driving the driving terminals 40 and 42 corresponding to both the touch panel display portion 3 and the touch key input portion 4, a first partial scan mode in which a touch detection operation is performed by driving only the driving terminal 40 corresponding to the touch panel display portion 3, or a second partial scan mode in which a touch detection operation is performed by driving only the driving terminal 42 corresponding to the touch key input portion 4. The control circuit 92 controls driving of the driving electrode for a detection frame and a detection operation from the detection electrode in the full scan mode, the first partial mode, or the second partial mode specified by the mode data written in the mode register 210. Whether to select any of the operation modes is determined by the mode data which is set in the mode register 210 by the sub processor 7 in a rewritable manner through the interface circuit 82.

The operation of each scan mode is as shown in FIGS. 12 to 14. As shown in each of the drawings, low power consumption is achieved by selecting the scanning of the display region 3 and the scanning of the button region 4 depending on operation modes. Further, in the operation modes of each drawing, in the scanning of the display region 3, both the driving terminals 40 and 42 are driven and only the detection circuit 71 is brought into operation within the detection circuits 71 and 72, and in the scanning of the button region 4, only the driving terminal 42 is driven within the driving terminals 40 and 42 and only the detection circuit 72 is brought into operation within the detection circuits 71 and 72. Thereby, it is possible to realize lower power consumption in each operation mode.

According to the above-mentioned touch panel display device 10, it is possible to obtain the same operations and effects as those in the above-mentioned touch panel display device 1B. Particularly, it is possible to further reduce the amount of invalid detection data than that in the touch panel display device 1B.

The present invention is not limited to the above-mentioned embodiments, but it goes without saying that various changes and modifications may be made without departing from the scope of the invention.

For example, the dot matrix-type display panel may be a electroluminescent panel or the like which is limited to a liquid crystal panel. The number of buttons of the touch key input portion is not limited to three, but may be set to an appropriate number. The detection characteristics of the detection circuit is not limited to be variable in both the calibration data and the integral capacitance value, but only either of them can be adopted, or other means can also be adopted. The present invention can be widely applied to but only a mobile terminal such as a tablet or a smartphone but also other data processing apparatuses and the like. The liquid crystal driver, the touch panel controller, and the sub processor are not limited to be configured in a single chip, but may be formed in multi-chips or may be individually formed in semiconductor integrated circuits.

What is claimed is:

1. A touch panel display device comprising:
   a touch panel display portion;
   a touch key input portion disposed adjacent to the touch panel display portion; and
   a touch panel controller that performs touch detection of a mutual capacitance detection type by driving the touch panel display portion and the touch key input portion,
   wherein the touch panel display portion includes a dot matrix-type display panel and a touch panel which are disposed so as to overlap each other, the touch panel having intersection capacitances formed in a matrix at intersecting portions of a plurality of first driving electrodes and a plurality of first detection electrodes,
   the touch key input portion includes a touch key pattern and a touch sensor which are disposed so as to overlap each other, the touch sensor having intersection capacitances at intersecting portions of a second driving electrode and second detection electrodes which are connected in series with a portion of the first detection electrodes,
   the touch panel controller includes
   driving terminals which are individually connected to the first driving electrodes and the second driving electrode,
   detection terminals which are individually connected to the first detection electrodes and a portion of which is also connected in common to the second detection electrodes,
   driving circuits that provide driving voltages to the driving terminals in a predetermined order,
   detection circuits including a plurality of integration circuits that integrate a potential change appearing at the detection terminal in synchronization with driving of the driving terminal, and
   a control circuit capable of switching detection characteristics of the plurality of integration circuits in accordance with a difference in load capacitance of detection from the touch panel display portion and detection from the touch key input portion.

2. The touch panel display device according to claim 1, wherein the detection circuit includes a calibration circuit that cancels an offset component superimposed on the potential change appearing in the detection terminal on the basis of calibration data, and
   wherein the control circuit switches the calibration data as the switching detection characteristics in accordance with the detection from the touch panel display portion and the detection from the touch key input portion.

3. The touch panel display device according to claim 2, wherein the control circuit includes a register circuit that holds calibration data in a rewritable manner, and a selection circuit that selects calibration data supplied from the register circuit to the calibration circuit in accordance with the detection from the touch panel display portion and the detection from the touch key input portion.

4. The touch panel display device according to claim 1, wherein the control circuit switches an integral capacitance value of the integration circuit as the switching detection characteristics in accordance with the detection from the touch panel display portion and the detection from the touch key input portion.

5. The touch panel display device according to claim 2, wherein the control circuit switches an integral capacitance value of the integration circuit as the switching detection characteristics in accordance with the detection from the touch panel display portion and the detection from the touch key input portion.

6. The touch panel display device according to claim 4, wherein the integration circuit includes a variable capacitive element that integrates the potential change, and
   the control circuit includes a register circuit that holds capacitance value instruction data of the variable capacitive element in a rewritable manner, and a selection circuit that selects integral capacitance value instruction data supplied from the register circuit to the variable capacitive element in accordance with the detection from the touch panel display portion and the detection from the touch key input portion.

7. The touch panel display device according to claim 5, wherein the integration circuit includes a variable capacitive element that integrates the potential change, and
   the control circuit includes a register circuit that holds capacitance value instruction data of the variable capacitive element in a rewritable manner, and a selection circuit that selects integral capacitance value instruction data supplied from the register circuit to the variable capacitive element in accordance with the detection from the touch panel display portion and the detection from the touch key input portion.

8. The touch panel display device according to claim 1, wherein the control circuit is able to select a full scan mode in which a touch detection operation is performed by driving the driving terminals corresponding to both the touch panel display portion and the touch key input portion, a first partial scan mode in which a touch detection operation is performed by driving only the driving terminal corresponding to the touch panel display portion, or a second partial scan mode in which a touch detection operation is performed by driving only the driving terminal corresponding to the touch key input portion.

9. The touch panel display device according to claim 8, the control circuit includes a mode register in which mode data for selecting the full scan mode, the first partial mode, or the second partial mode is set in a rewritable manner.

10. A touch panel controller that performs touch detection of a mutual capacitance detection type by driving a touch panel display portion and a touch key input portion disposed adjacent to the touch panel display portion,
   wherein the touch panel display portion includes a dot matrix-type display panel and a touch panel which are disposed so as to overlap each other, the touch panel having intersection capacitances formed in a matrix at intersecting portions of a plurality of first driving electrodes and a plurality of first detection electrodes,
   the touch key input portion includes a touch key pattern and a touch sensor which are disposed so as to overlap each other, the touch sensor having intersection capacitances at intersecting portions of a second driving electrode and second detection electrodes,
   the touch panel controller includes
   driving terminals which are individually connected to the first driving electrodes and the second driving electrode,
   detection terminals which are individually connected to the first detection electrodes and a portion of which is also connected in common to the second detection electrodes,
   driving circuits that provide driving voltages to the driving terminals in a predetermined order,
   detection circuits including a plurality of integration circuits that integrate a potential change appearing at the detection terminal in synchronization with driving of the driving terminal, and
   a control circuit capable of switching detection characteristics of the integration circuits in accordance with a difference of load capacitance of detection from the touch panel display portion and detection from the touch key input portion.

11. A touch panel display device comprising:
   a touch panel display portion;
   a touch key input portion disposed adjacent to the touch panel display portion; and
   a touch panel controller that performs touch detection of a mutual detection capacitance type by driving the touch panel display portion and the touch key input portion,
   wherein the touch panel display portion includes a dot matrix-type display panel and a touch panel which are disposed so as to overlap each other, the touch panel having intersection capacitances formed in a matrix at intersecting portions of a plurality of first driving electrodes and a plurality of first detection electrodes,
   the touch key input portion includes a touch key pattern and a touch sensor which are disposed so as to overlap each other, the touch sensor having intersection capacitances at intersecting portions of a second driving electrode and second detection electrodes,
   the touch panel controller includes
   driving terminals which are individually connected to the first driving electrodes and the second driving electrode,
   detection terminals which are individually connected to the first detection electrodes and the second detection electrodes,
   driving circuits that provide driving voltages to the driving terminals in a predetermined order,
   detection circuits including a plurality of integration circuits that integrate a potential change appearing at the detection terminal in synchronization with driving of the driving terminals, and
   a control circuit that controls operations of the driving circuit and the detection circuit,
   wherein a difference exists between detection characteristics of the integration circuit connected to the detection terminal corresponding to the first detection electrode and detection characteristics of the integration circuit connected to the detection terminal corresponding to the second detection electrode, and
   wherein the difference is in accordance with a difference load capacitance of detection from the touch panel display portion and detection from the touch key input portion.

12. The touch panel display device according to claim 11, wherein the control circuit is able to select a full scan mode in which the driving terminals corresponding to each of the touch panel display portion and the touch key input portion are driven and a touch detection operation is performed using an input from the detection terminals corresponding to each of the touch panel display portion and the touch key input portion, a first partial scan mode in which the driving terminal corresponding to the touch panel display portion is driven and a touch detection operation is performed using an input from the detection terminal corresponding to the touch panel display portion, or a second partial scan mode in which the driving terminal corresponding to the touch key input portion is driven and a touch detection operation is performed using an input from the detection terminal corresponding to the touch key input portion.

13. The touch panel display device according to claim 12, the control circuit includes a mode register in which mode data for selecting the full scan mode, the first partial mode, or the second partial mode is set in a rewritable manner.

14. A touch panel controller that performs touch detection of a mutual capacitance detection type by driving a touch panel display portion and a touch key input portion disposed adjacent to the touch panel display portion,
   wherein the touch panel display portion includes a dot matrix-type display panel and a touch panel which are disposed so as to overlap each other, the touch panel having intersection capacitances formed in a matrix at intersecting portions of a plurality of first driving electrodes and a plurality of first detection electrodes,
   the touch key input portion includes a touch key pattern and a touch sensor which are disposed so as to overlap each other, the touch sensor having intersection capacitances at intersecting portions of a second driving electrode and second detection electrodes,
   the touch panel controller includes
   driving terminals which are individually connected to the first driving electrodes and the second driving electrode,
   detection terminals which are individually connected to the first detection electrodes and the second detection electrodes,
   driving circuits that provide driving voltages to the driving terminals in a predetermined order, and
   detection circuits including a plurality of integration circuits that integrate a potential change appearing at the detection terminal in synchronization with driving of the driving terminal,
   wherein a difference exists between detection characteristics of the integration circuit connected to the detection terminal corresponding to the first detection electrode and detection characteristics of the integration the second detection electrode, and wherein the difference is in accordance with a difference load capacitance of detection from the touch panel display portion and detection from the touch key input portion.

15. A touch panel display device comprising:

a touch panel display portion;

a touch key input portion disposed adjacent to the touch panel display portion; and a touch panel controller that performs touch detection of a mutual capacitance detection type by driving the touch panel display portion and the touch key input portion, wherein the touch panel display portion includes a dot matrix-type display panel and a touch panel which are disposed so as to overlap each other, the touch panel having intersection capacitances formed in a matrix at intersecting portions of a plurality of first driving electrodes and a plurality of first detection electrodes, the touch key input portion includes a touch key pattern and a touch sensor which are disposed so as to overlap each other, the touch sensor having intersection capacitances at intersecting portions of a second driving electrode and second detection electrodes, the touch panel controller includes detection terminals which are individually connected to the first detection electrodes and the second detection electrodes, driving terminals which are individually connected to the first driving electrodes and a portion of which is also connected in common to the second driving electrode, driving circuits that provide driving voltages to the driving terminals in a predetermined order, detection circuits including a plurality of integration circuits that integrate a potential change appearing at the detection terminal in synchronization with driving of the driving terminal, and a control circuit that controls operations of the driving circuit and the detection circuit, wherein a difference exists between detection characteristics of the integration circuit connected to the detection terminal corresponding to the first detection electrode and detection characteristics of the integration the second detection electrode, and wherein the difference is in accordance with a difference load capacitance of detection from the touch panel display portion and detection from the touch key input portion.

16. The touch panel display device according to claim 15, wherein the control circuit is able to select a full scan mode in which the driving terminals corresponding to each of the touch panel display portion and the touch key input portion are driven and a touch detection operation is performed using an input from the detection terminals corresponding to each of the touch panel display portion and the touch key input portion, a first partial scan mode in which the driving terminal corresponding to the touch panel display portion is driven and a touch detection operation is performed using an input from the detection terminal corresponding to the touch panel display portion, or a second partial scan mode in which the driving terminal corresponding to the touch key input portion is driven and a touch detection operation is performed using an input from the detection terminal corresponding to the touch key input portion.

17. The touch panel display device according to claim 16, the control circuit includes a mode register in which mode data for selecting the full scan mode, the first partial scan mode, or the second partial scan mode is set in a rewritable manner.

18. A touch panel controller that performs touch detection of a mutual capacitance detection type by driving a touch panel display portion and a touch key input portion disposed adjacent to the touch panel display portion, wherein the touch panel display portion includes a dot matrix-type display panel and a touch panel which are disposed so as to overlap each other, the touch panel having intersection capacitances formed in a matrix at intersecting portions of a plurality of first driving electrodes and a plurality of first detection electrodes, the touch key input portion includes a touch key pattern and a touch sensor which are disposed so as to overlap each other, the touch sensor having intersection capacitances at intersecting portions of a second driving electrode and second detection electrodes, the touch panel controller includes detection terminals which are individually connected to the first detection electrodes and the second detection electrodes, driving terminals which are individually connected to the first driving electrodes and a portion of which is also connected in common to the second driving electrode, driving circuits that provide driving voltages to the driving terminals in a predetermined order, and detection circuits including a plurality of integration circuits that integrate a potential change appearing at the detection terminal in synchronization with driving of the driving terminal, wherein a difference exists between detection characteristics of the integration circuit connected to the detection terminal corresponding to the first detection electrode and detection characteristics of the integration circuit connected to the detection terminal corresponding to the second detection electrode, and wherein the difference is in accordance with a difference load capacitance of detection from the touch panel display portion and detection from the touch key input portion.

\* \* \* \* \*